C. L. THOMAS.
UPTHROW CUSHION SPRING FOR VEHICLES.
APPLICATION FILED MAR. 3, 1908.

926,685. Patented June 29, 1909.

Witnesses
Stuart Hilder.
George M. Anderson.

Inventor
Charles L. Thomas
By E. W. Anderson
his Attorney

UNITED STATES PATENT OFFICE.

CHARLES LEE THOMAS, OF CANISTEO, NEW YORK, ASSIGNOR OF ONE-HALF TO FRANK CAULKINGS, OF CANISTEO, NEW YORK.

UPTHROW CUSHION-SPRING FOR VEHICLES.

No. 926,685.   Specification of Letters Patent.   Patented June 29, 1909.

Application filed March 3, 1908. Serial No. 419,065.

*To all whom it may concern:*

Be it known that I, CHARLES LEE THOMAS, a citizen of the United States, resident of Canisteo, in the county of Steuben and State of New York, have made a certain new and useful Invention in Upthrow Cushion-Springs for Vehicles; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
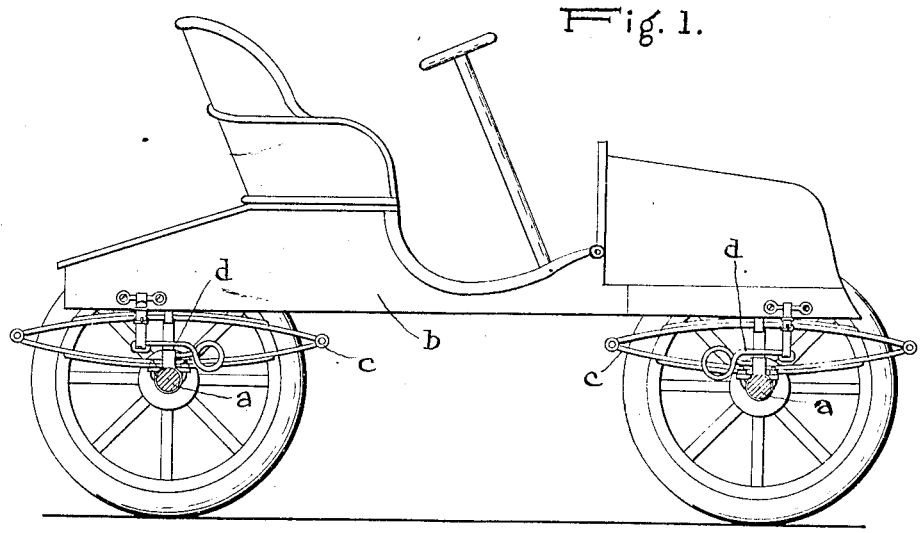
Figure 2:
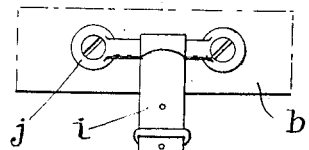
Figure 3:
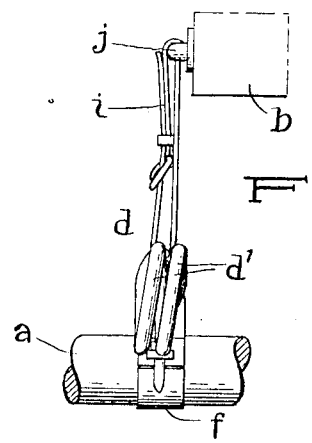
Figure 6:
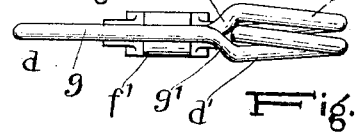
Figure 5:
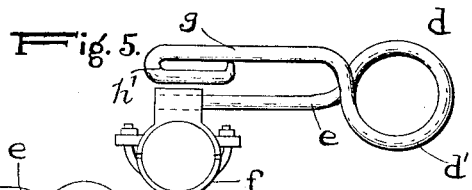
Figure 4:
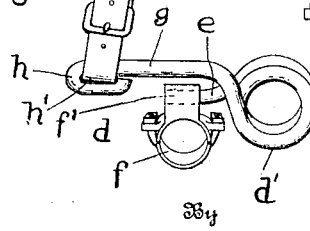

Figure 1 is a side view of the invention as applied to an automobile. Fig. 2 is a similar view on a larger scale showing a portion of the automobile. Fig. 3 is an end view of the invention as applied. Fig. 4 is a perspective view of the invention. Fig. 5 is a side view of a modified form of spring, and Fig. 6 is a plan view of the spring.

The invention has relation to improved means for controlling the upward movement of the spring supported body of an automobile or other vehicle with relation to the vehicle axles or running gear, or to check the upthrow of the body due to inequalities or obstructions of the roadbed.

Another object is to relieve the vehicle springs of strain owing to the causes above named, which frequently brings about breakage of such springs and may be of character to cause serious accident and loss of life.

With this object in view the invention consists of the novel construction and combinations of parts as hereinafter set forth.

In the accompanying drawings, illustrating the invention, the letters $a, a$, designate the axles of an automobile and $b$, the body thereof, supported from such axles by the springs $c, c$.

Each spring controlling device $d$, consists of a plurality of upright coils $d'$, (usually two) arranged side by side, an attaching arm $e$, having at one end connection with the upper portion of one end coil forming an extension thereof and at its opposite end connection with an upward projection $f'$, of a clip $f$, attached to an end portion of the axle $a$; and a free arm $g$, arranged above the attaching arm in substantially the same vertical plane therewith and having connection at one end with the lower portion of the other end coil, forming an extension thereof. The arm $g$, may cross the axle $a$, as shown in Figs. 2, 3, 4 and 6 of the drawings, when it is longer than the other arm $e$, and is reversely bent at its outer end at $h$, to form a downturned attachment loop $h'$, located when the arm crosses the axle at about the same distance therefrom on one side as the coils $d'$, are distant therefrom on the other side. The upper and lower free and attachment arms or coil extensions are located in the same plane one directly above the other and in the center of the coils of the spring, being thus provided with laterally bent end portions $e'$, and $g'$, which cross each other. A leather strap connection $i$, is provided, having attachment at its lower end with the loop $h'$, and at its upper end attachment with a bracket attachment $j$, of the vehicle body. The strap is provided with a buckle and suitable adjustment holes so that any stretching thereof may be provided for or taken up.

In Fig. 5 of the drawing the upper free arm is shown of about the same length as the lower attachment arm. While in the drawing the coils of the spring $d'$, are shown as having the planes thereof transverse or crosswise with respect to the axle $a$, this is not regarded as essential.

One of the controlling devices $d$, is provided at each end of both axles or at each corner of the vehicle, and the strap connections $i$, being adjusted to leave no slack therein, any upthrow of the vehicle body will immediately act upon the controlling device or devices most subject to the shock, to tighten the coils $d'$, of the springs, which are at the same time prevented from any sudden or violent action thereupon by the spring character of the long arms $g'$. The result has been found in practice to effectually check the upthrow of the vehicle body and to cause the automobile to travel in a smooth and even manner upon rough roads. The upper and lower free and attachment arms or coil extensions having connection respectively with the lower portion of one end coil of the spring and with the upper portion of the other end coil and crossing each other, a stiff spring is provided, the coils of the spring are tightened upon upward movement of the body of the vehicle and strain is reduced at the axle clip connection. The location of said arms or extensions in the same vertical plane is also of advantage in reducing strain at the axle clip connection.

Having described the invention, what I claim and desire to secure by Letters Patent is:

1. A spring for checking the upward movement of a vehicle body, comprising upright coils arranged side by side, an attaching arm extension from the upper portion of one end coil having means for attachment to the running gear, and a free arm extension from the lower portion of the other end coil crossing said attaching arm extension and provided with a loop at its free end having means for flexible connection with the vehicle body.

2. A spring for checking the upward movement of a vehicle body, comprising upright coils arranged side by side, an attaching arm connected with the upper portion of one end coil and having means for attachment to the running gear, and a free arm connected with the lower portion of the other end coil and having means for flexible connection with the vehicle body, said attaching arm being arranged below said free arm and in substantially the same vertical plane therewith.

3. The combination with the running gear and the body of a vehicle, of a spring for checking the upward movement of the body away from the running gear, which spring comprises upright coils arranged side by side, an attaching arm connected with the upper portion of one end coil and secured to the running gear, and a free arm connected with the lower portion of the other end coil and flexibly connected with the vehicle body, said attaching arm being arranged below said free arm and in substantially the same vertical plane therewith.

4. A device for the purpose described, consisting of a coiled spring having a lower arm substantially parallel to the planes of the coils and provided with a laterally bent end portion and an axle clamp, and an upper arm extending in the same direction as the lower arm and provided with means for flexible connection with the vehicle body and a downward and laterally bent end portion crossing the inner end of the lower arm, the upper and lower arms being located in the same plane one directly above the other and in the center of the coils of the spring.

5. A device for the purpose described, consisting of a coiled spring the planes of the coils of which are arranged crosswise of the vehicle axle at one side thereof, and having a lower short arm substantially parallel to the planes of the coils and provided with a laterally bent end portion and an axle clamp, and an upper long arm extending in the same direction as the lower arm and provided with means for flexible connection with the vehicle body at the opposite side of the axle and a downward and laterally bent end portion crossing the inner end of the lower arm, the upper and lower arms being located in the same plane one directly above the other and in the center of the coils of the spring.

In testimony whereof I affix my signature, in presence of two witnesses.

CHARLES LEE THOMAS.

Witnesses:
H. E. BUCK,
T. J. MAGNER.